(12) United States Patent  
Tiemuer et al.

(10) Patent No.: US 12,380,134 B2
(45) Date of Patent: Aug. 5, 2025

(54) PROVIDING A HYBRID GENERIC ATTRIBUTE DATABASE

(71) Applicant: Silicon Laboratories Inc., Austin, TX (US)

(72) Inventors: Aikeremu Tiemuer, Helsinki (FI); Yongjiang Yu, Espoo (FI); Toni Kettula, Espoo (FI); Mikko Loytynoja, Espoo (FI)

(73) Assignee: Silicon Laboratories Inc., Austin, TX (US)

( * ) Notice: Subject to any disclaimer, the term of this patent is extended or adjusted under 35 U.S.C. 154(b) by 0 days.

(21) Appl. No.: 17/838,641

(22) Filed: Jun. 13, 2022

(65) Prior Publication Data

US 2023/0401237 A1 Dec. 14, 2023

(51) Int. Cl.
G06F 16/28 (2019.01)
G06F 16/22 (2019.01)
G06F 16/23 (2019.01)

(52) U.S. Cl.
CPC ........ *G06F 16/285* (2019.01); *G06F 16/2228* (2019.01); *G06F 16/235* (2019.01); *G06F 16/288* (2019.01)

(58) Field of Classification Search
None
See application file for complete search history.

(56) References Cited

U.S. PATENT DOCUMENTS

| 8,146,054 B2* | 3/2012 | Baker | G06F 16/289 |
| | | | 717/151 |
| 2003/0078907 A1* | 4/2003 | Soemo | G06F 16/24552 |
| 2008/0141003 A1* | 6/2008 | Baker | G06F 16/289 |
| | | | 712/E9.016 |
| 2010/0228912 A1* | 9/2010 | Huang | G06F 12/0897 |
| | | | 711/108 |
| 2014/0012881 A1* | 1/2014 | Roesch | G06F 16/217 |
| | | | 707/792 |

FOREIGN PATENT DOCUMENTS

CN 109522293 B * 8/2021 ............. G06F 8/41

OTHER PUBLICATIONS

Development of a wearable actigraph with Bluetooth Low Energy link and implementation of a dedicated Android App, Knaliftz et al (Year: 2021).*

(Wireless Wearable Microsystem for Continuous Respiratory Rate Monitoring Based on Pulse Oximetry), Greeshma Jayasheel Gowda (Year: 2019).*

Silicon Labs, "GATT Server and Client Roles," 2022, , V3.2, pp. 1-17.

(Continued)

*Primary Examiner* — Augustine K. Obisesan
(74) *Attorney, Agent, or Firm* — Trop, Pruner & Hu, P.C.

(57) ABSTRACT

In one aspect, an apparatus includes: a volatile memory to store a dynamic portion of a hybrid generic attribute (GATT) database structure; and a non-volatile memory coupled to the volatile memory to store a static portion of the hybrid GATT database structure, where the volatile memory is to store an attribute index array to identify whether an attribute datum of the hybrid GATT database structure is stored in the volatile memory or the non-volatile memory.

20 Claims, 7 Drawing Sheets

(56) References Cited

OTHER PUBLICATIONS

Silicon Labs, "QSG169: Bluetooth SDK v3 .x Quick-Start Guide," 2022, Rev. 0.9, pp. 1-41.
Silicon Labs, "UG438: GATT Configurator User's Guide for Bluetooth SDK v3 .x," Date Unknown, Rev. 0.2, pp. 1-15.
Khoury, U.S. Appl. No. 17/01,742, entitled Analog-to-Digital converter Having Punctured Quantizer, filed Mar. 23, 2022, pp. 31.

* cited by examiner

PROVIDING A HYBRID GENERIC ATTRIBUTE DATABASE

BACKGROUND

The Bluetooth wireless protocol uses a Generic Attribute (GATT) profile to define services and their characteristics. The collection of services and their characteristics is called a GATT database, and applications that use the Bluetooth protocol leverage this database. The database can consume a significant amount of memory depending on the complexity of an application.

A static GATT database is defined with services and characteristics during development of an application and is stored in non-volatile memory in the application's read-only data section. When running, the application uses the GATT database directly from the non-volatile memory; however it is not possible to modify the database structures once the application is running. This approach saves most amount of volatile memory, but is least flexible.

A dynamic GATT database provides program interfaces to create or modify the dynamic GATT database in volatile memory, which is allocated on an on-demand basis when the new elements are added. This approach can use a larger amount of volatile memory, but provides more flexibility than a static GATT database.

As seen there are benefits and drawbacks to both static and dynamic GATT databases.

SUMMARY OF THE INVENTION

In one aspect, an apparatus comprises: a volatile memory to store a dynamic portion of a hybrid generic attribute (GATT) database structure; and a non-volatile memory coupled to the volatile memory to store a static portion of the hybrid GATT database structure, where the volatile memory is to store an attribute index array to identify whether an attribute datum of the hybrid GATT database structure is stored in the volatile memory or the non-volatile memory.

In an embodiment, the attribute index array comprises a plurality of entries, each of the plurality of entries to point to a location of an attribute datum within the volatile memory or the non-volatile memory. The non-volatile memory may further include a second attribute index array, where the apparatus is to write the second attribute index array into the attribute index array when an update to the hybrid GATT database structure is to occur. The plurality of entries may have a uniform size, each of the plurality of entries comprising type information and address information to identify an attribute datum of the hybrid GATT database structure. In an embodiment, the apparatus is to dynamically add one or more entries to the attribute index array, the one or more entries to point to one or more attribute data dynamically stored in the dynamic portion of the hybrid GATT database structure.

In an embodiment, the apparatus comprises a wireless device, the wireless device to execute an application, the application to dynamically update the dynamic portion of the hybrid GATT database structure via one or more application programming interfaces. The apparatus may be a wireless device, and in a network coprocessor mode, the wireless device is to receive one or more application programming interface commands from a host device coupled to the wireless device and, in response to the one or more application programming interface commands, dynamically update the dynamic portion of the hybrid GATT database structure.

In an embodiment, the static portion of the hybrid GATT database structure is to be defined via a software development kit, the software development kit to convert attribute data of the static portion of the hybrid GATT database structure into code to enable the code to be stored into the non-volatile memory. The dynamic portion of the hybrid GATT database structure may include a plurality of attribute data, where each of the plurality of attribute data is adjacent at least one other of the plurality of attribute data. The non-volatile memory may be a flash memory comprising a firmware for a wireless device, the firmware comprising the static portion of the hybrid GATT database structure.

In another aspect, a method comprises: receiving, via an application programming interface, an updated database definition of a hybrid GATT database comprising a static portion stored in a non-volatile memory and a dynamic portion stored in a volatile memory; in response to the updated database definition, storing updated attribute data in the volatile memory; and storing an entry to the updated attribute data in an attribute index array of the volatile memory.

In an embodiment, the method further comprising receiving the updated attribute data from an application in execution on a wireless device, the wireless device further comprising the non-volatile memory and the volatile memory. The method may further include informing a host device regarding completion of an update to the hybrid GATT database after storing the entry to the attribute index array. The method may further include storing the updated attribute data in response to a field request for a GATT database update received in a wireless device from a host device. The method may further include receiving the field request in a network coprocessor mode via a serial protocol from an application in execution on the host device. The method may further include writing a second attribute index array associated with the static portion and obtained from the non-volatile memory into the attribute index array.

In an embodiment, the method further includes: accessing at least one attribute datum from the dynamic portion stored in the volatile memory using a first entry stored in the attribute index array; accessing at least one second attribute datum from the static portion stored in the non-volatile memory using a second entry included in the second attribute index array; and sending the at least one attribute datum and the at least one second attribute datum to a requester.

In another aspect, a system includes a wireless processor comprising a radio frequency transceiver circuit, conversion circuitry, and digital circuitry comprising a volatile memory and a non-volatile memory. The volatile memory may be a random access memory to store a dynamic portion of a hybrid GATT database structure, and the non-volatile memory may be a flash memory coupled to the volatile memory to store a static portion of the hybrid GATT database structure. The wireless processor may dynamically update one or more attribute datum stored in the volatile memory and provide one or more entries in an attribute index array of the volatile memory to point to the one or more updated attribute datum.

In an embodiment, the attribute index array comprises a plurality of entries, each of the plurality of entries to point to a location of an attribute datum within the volatile memory or the non-volatile memory, and the non-volatile memory further may include a second attribute index array, where the wireless processor is to write the second attribute index array into the volatile memory.

In an embodiment, in a network coprocessor mode, the wireless processor is to receive an update request via one or more application programming interfaces from an application in execution on a host device and in response to the update request, to dynamically update the one or more attribute datum stored in the volatile memory, the dynamic update comprises adding at least one attribute datum to the volatile memory.

DETAILED DESCRIPTION

In various embodiments, a hybrid GATT database enables an application to take advantage of both static and dynamic GATT implementations. In this way, an application can define a portion of an overall GATT database that is not expected to be changed as a static GATT database portion to be stored in a non-volatile memory. Then a remainder of the hybrid GATT database may be dynamically added and stored in a volatile memory as a dynamic GATT database portion.

In one or more embodiments, a configurator or other design time tool, which may be included in a software development kit (SDK), may be used to create the static GATT database portion of a hybrid GATT database. The SDK is a Bluetooth SDK that enables applications to be developed on top of a Bluetooth stack, e.g., using a C programming language. Then application program interfaces (APIs) can be used to create the dynamic GATT database portion of the hybrid GATT database. Both parts of database work seamlessly together and appear as a single entity to a client application.

A wireless device such as an internet of things (IoT) device or other small portable device that may include an embedded system-on-chip (SoC) may more readily store, maintain and use a hybrid GATT database in accordance with an embodiment. This is especially so, as such wireless devices may have limited amounts of volatile and non-volatile memory (particularly where random access memory (RAM) or other volatile memory is very limited). As such, embedded applications may use flash or other non-volatile memory for storing a hybrid GATT database when possible and save RAM in order to optimize overall performance and cost.

Figure 1:
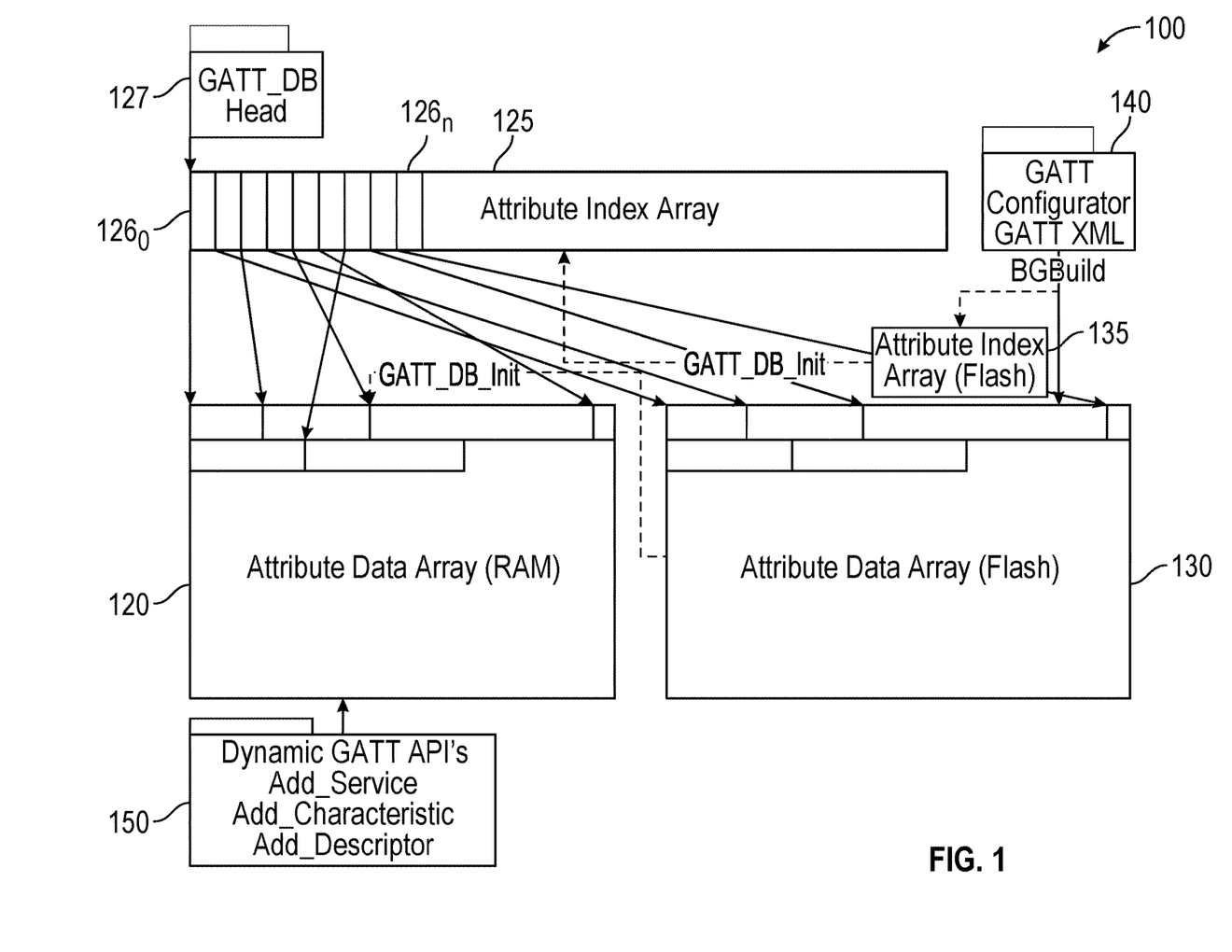
FIG. 1 is a block diagram of a hybrid GATT database in accordance with an embodiment.

Referring now to FIG. 1, shown is a block diagram of a hybrid GATT database in accordance with an embodiment. As shown in FIG. 1, a hybrid GATT database architecture 100 provides for a hybrid configuration in which both volatile and non-volatile memory are used to store the GATT database. Specifically as shown in FIG. 1, a hybrid GATT database may be formed from data structures present in multiple memories. Specifically as shown, the hybrid GATT database includes a first portion stored in a volatile memory 120, e.g., a random access memory (RAM), that is configured to store attribute data in an attribute data array of GATT information. In addition, the hybrid GATT database includes a second portion stored in a non-volatile memory 130, e.g., a flash memory, that is configured to store other attribute data in another attribute data array of GATT information.

With this configuration, an initial portion of a GATT database may be stored in non-volatile memory 130. Such static portion of the GATT database may be generated using a GATT configurator 140. In one or more embodiments, GATT configurator 140 may be implemented within a Bluetooth SDK, and may generate the database using GATT XML-based commands. In an embodiment, GATT configurator 140 may enable building the static portion of the GATT database in a visual way, without hand editing the XML file. As part of the building of this static portion of a GATT database, GATT configurator 140, via a build API, may further generate an attribute index 135, which also may be stored in non-volatile memory 130.

Another software tool, shown as BGBuild, may convert an XML version of the static database structure into code, e.g., of a C language. In one or more embodiments, the static GATT database portion may, for the most part, be generated as constant data fields and be compiled into an application's read-only data section in the binary.

Still with reference to FIG. 1, in a hybrid GATT implementation, additional GATT information is stored in volatile memory 120. To enable identification of location of various database objects, another attribute index array 125 is present, also within the volatile memory 120. With a hybrid database implementation, attribute index 135 may be copied to attribute index array 125. With this arrangement, APIs may be able to remove or hide attributes from the static portion of the hybrid GATT database stored in non-volatile memory 130.

In another embodiment, attribute index array 135 may not be loaded from the static portion of the hybrid GATT database into new attribute index array 125 allocated in volatile memory 120. In this way, even more space in volatile memory 120 may be saved. In such arrangement, when trying to locate an attribute, both of arrays 125 and 135 may be searched. With this arrangement, only those dynamically added database elements can be deleted or hidden by delete or stop APIs.

Still referring to FIG. 1, example entries $126_0$-$126_n$ may be present within attribute index array 125, which act as entries to various data objects, both within volatile memory 120 and non-volatile memory 130. To identify a beginning of the GATT database, a head entry 127 may point to a first entry $126_0$ within attribute index array 125.

In an embodiment, attribute index array 125 may include equal sized objects, therefore there is no need for entries to next and previous attributes. Index objects may include certain information such as handle, type and address (e.g., real address in memory) of the actual data structure (of an attribute) within the data array. In this way, attribute data can be saved in a data array next to each other and in that way, waste no RAM. The contents of a given attribute can be accessed in response to obtaining an entry to the attribute data using the address information and casted to correct data structure type using the type information. In one or more embodiments, each entry in attribute index array 125 may contain metadata about attribute and data type and address information to identify an attribute datum from a larger attribute data block. That larger block of memory is allocated for preventing fragmentation in the memory by allocating a small block for each attribute data. Note that this larger block of attribute data in volatile memory can grow or shrink in size as needed.

As further shown in FIG. 1, dynamic GATT APIs 150 may be used to dynamically add on demand attributes into volatile memory 120. In an embodiment a start change API may be used to start a database update session, with a session ID returned for updating the database with the rest of APIs in this class. When a session is started, the database is locked for editing by this session only. The session is closed after committing or aborting the changes.

In turn, additional APIs may include an add service API to add a service declaration into the database (RAM portion). On success, the service is in database but not yet started. A remove service API may remove a service and its attributes from the database. An add characteristic API adds a characteristic declaration to a service. A remove characteristic API removes a characteristic from a service by removing the characteristic and its descriptors An add descriptor API may be used to add a descriptor to a characteristic. A remove descriptor API may remove a descriptor from a characteristic. Of course, additional such APIs, including start/stop service/characteristics also may be used to toggle the visibility of services and characteristics without erasing or recreating them from the memory. Database elements created dynamically in this manner may be more flexible and can support operations such as adding, removing or hiding temporarily such database elements. Understand while shown at this high level in the embodiment of FIG. 1, many variations and alternatives are possible.

Figure 2:
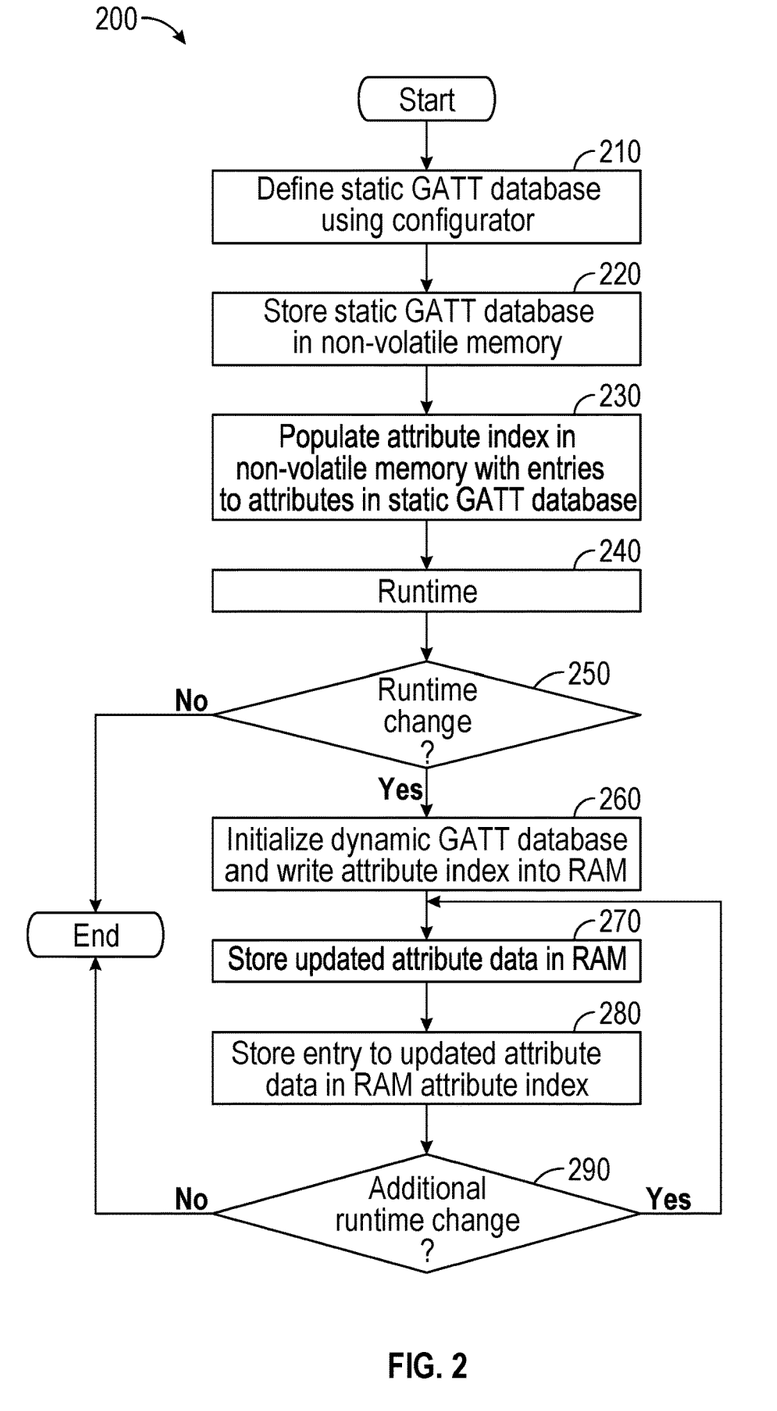
FIG. 2 is a flow diagram of a method in accordance with an embodiment.

Referring now to FIG. 2, shown is a flow diagram of a method in accordance with an embodiment. As shown in FIG. 2, method 200 is a method for generating a hybrid GATT database in accordance with an embodiment. As such, method 200 may be performed by different entities, including an initial development team that generates a static portion of a GATT database that is to be written into a flash or other non-volatile memory. In addition, when runtime changes are desired, a potentially different entity (or the same developer) may cause dynamic updates to the GATT database for storage into RAM or other volatile memory.

As illustrated, method 200 begins by defining a static GATT database using a configurator (block 210). Although embodiments are not limited in this regard, in an example, a GATT configurator that operates using an XML tool may be used to define the static GATT database portion. At block 220, this static GATT database portion may be stored into non-volatile memory, e.g., flash. Then at block 230, an attribute index may be populated within this non-volatile memory. This attribute index may include entries to the various attributes present within the static GATT database. At this point a device may be appropriately configured with a GATT database that provides for at least basic operation of a Bluetooth application that is to use the GATT database.

Still referring to FIG. 2, optional updates to the GATT database may occur during runtime (block 240). More specifically, it may be determined at diamond 250 whether runtime changes are desired. If not, operation may proceed using the static database stored in flash, using entries that are stored in the attribute index of the flash memory, and no update operations occur, with the GATT database stored in the non-volatile memory accessed during application execution.

Otherwise, if it is determined that runtime changes such as one or more updated GATT database definitions are desired, control passes to block 260. At block 260, a dynamic GATT database may be initialized by allocating RAM for its storage, thus realizing the hybrid GATT database. Further at block 260, the attribute index may be written into RAM from the non-volatile memory. Then at block 270 updated attribute data may be stored into the dynamic portion of the hybrid GATT database structure stored in RAM. To this end, one or more dynamic GATT APIs may be used to write this attribute data. Next at block 280, an entry may be stored to this updated attribute data in the RAM attribute index. Finally, it may be determined at diamond 290 whether additional runtime changes are desired. If so, control passes back to block 270. Otherwise, method 200 may conclude.

Note that while shown at this high level in FIG. 2 illustrating the various changes, in one or more implementations, the actual changes or updates to the GATT database do not occur until the APIs provide feedback as to whether a particular update operation has been successful. Then a host may call a commit API to enable the changes to become committed and thus visible to clients. In other cases, updates may be selectively aborted, in which these aborted changes are rewound such that the database, prior to the update, is reinstated. Understand while shown at this high level in the embodiment of FIG. 2, many variations and alternatives are possible.

Figure 3:
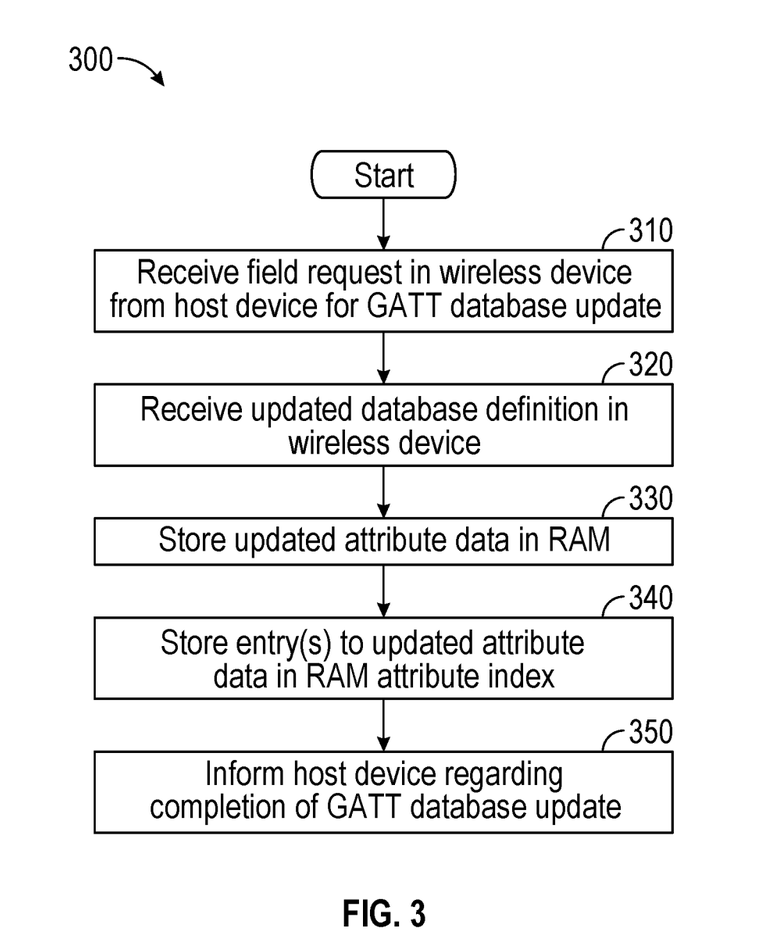
FIG. 3 is a flow diagram of a method in accordance with another embodiment.

Referring now to FIG. 3, shown is a method in accordance with another embodiment. More specifically as shown in FIG. 3, a dynamic GATT database update operation in a network coprocessor (NCP) mode is illustrated. In such arrangement, a host processor may send commands to a wireless device to perform the dynamic updates. As illustrated, method 300 begins by receiving a field request in the wireless device from the host device for a GATT database update (block 310). Control next passes to block 320, to receive an updated database definition for the hybrid GATT database structure in the wireless device. Then at block 330, updated attribute data may be stored into RAM. In addition, one or more entries may be stored within the RAM attribute index to point to the updated attributes (block 340). Finally at block 350, the host device may be informed regarding the completion of the GATT database update. Understand while shown with this arrangement in FIG. 3, as described above, other variations and alternatives are possible such as where only a link layer of the Bluetooth stack runs on the wireless device, and a host layer of the stack, as well as the application, runs on a separate host device (e.g., a MCU or a personal computer), where the link layer and the host layer communicate via a host controller interface.

Figure 4:
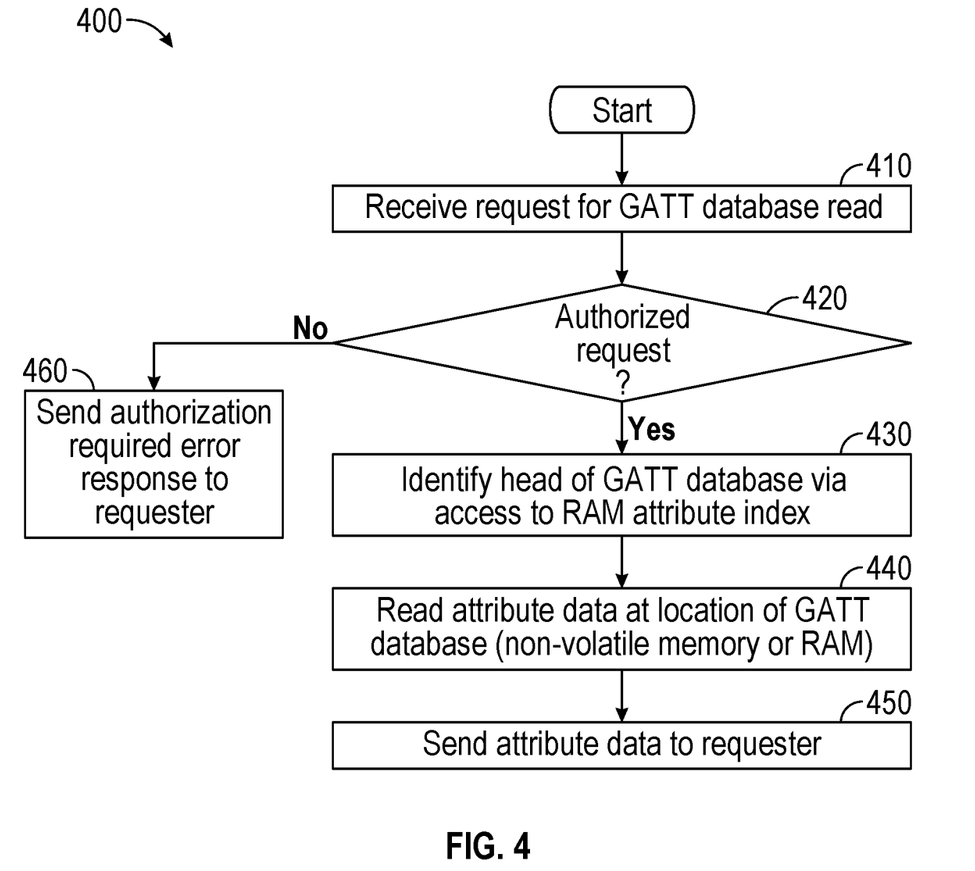
FIG. 4 is a flow diagram of a method in accordance with yet another embodiment.

Referring now to FIG. 4, shown is a flow diagram of a method in accordance with yet another embodiment. More specifically, method 400 is a method for reading data from a GATT database, e.g., responsive to a read request from a client. In an embodiment, method 400 may be performed by hardware circuitry within the wireless device that maintains the hybrid GATT database. As illustrated, method 400 begins by receiving a request for a GATT database read (block 410). Next, it may be determined at diamond 420 whether the request is authorized. If not, no further operations occur as to allowing the read to occur. Instead at block 460 a response may be sent to the requester to inform that an error has occurred because authorization is required. Note that this authorization determination at diamond 420 may be optional in some cases. Or the authorization determination may only occur with regard to certain database information, e.g., one or more attributes that are indicated as being secure and requiring authentication.

Assuming the request is authorized, control passes to block 430 where a head of the GATT database may be identified, e.g., with reference to the RAM attribute index in the case of a hybrid GATT database structure. Next at block 440 attribute data of the GATT database may be read. More specifically, one or more attribute datum may be read from a given location indicated by an entry in the RAM attribute index, where the location may be present in either volatile or non-volatile memory. Then at block 450, the attribute data may be sent to the requester, e.g., a client. Understand while shown at this high level in the embodiment of FIG. 4, many variations and alternatives are possible.

Figure 5A:
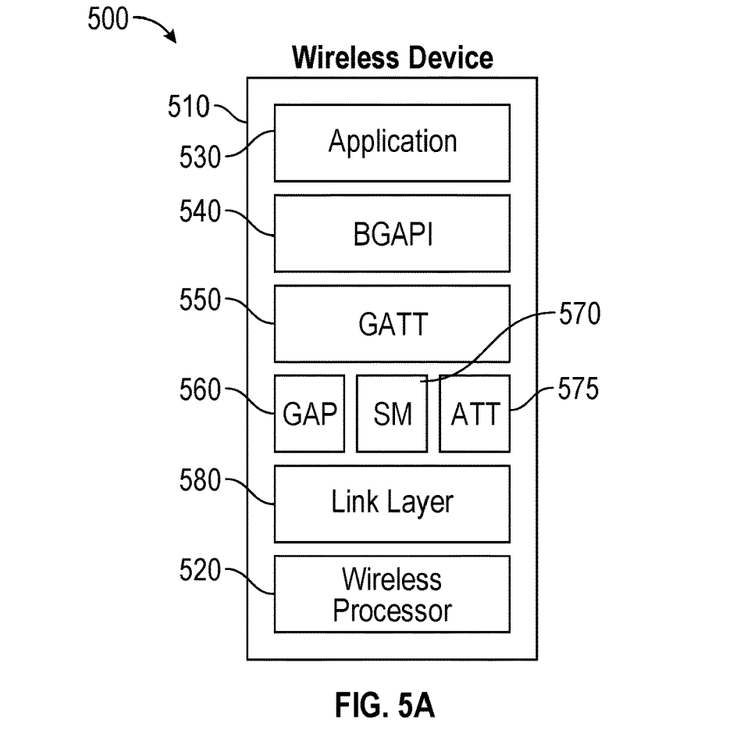
FIGS. 5A and 5B are block diagrams of wireless environments in accordance with embodiments.

Embodiments may be implemented in different types of system implementations. Referring now to FIG. 5A, shown is a block diagram of a wireless environment including a wireless device in accordance with an embodiment.

As shown in FIG. 5A, wireless environment 500 includes a wireless device 510 that provides hardware including a wireless processor 520. In an embodiment, wireless processor 520 may be implemented as a single die integrated circuit such as an SoC to provide both radio functionality and digital processing. At a high level, wireless processor 520 includes analog front end circuitry, radio frequency circuitry, conversion circuitry, and digital processing circuitry, along with one or more general-purpose processing cores.

As illustrated, various software and/or firmware layers may execute on wireless processor 520. At a highest level of a layered stack, an application 530 may be any type of IoT-based application that seeks to communicate wirelessly using Bluetooth. To provide an interface between application 530 and underlying components of a Bluetooth layered stack, a Bluetooth API 540 (BGAPI) may be provided. In an embodiment, BGAPI 540 provides access to all Bluetooth functionality implemented by the Bluetooth stack. In an embodiment, the Bluetooth stack is an advanced Bluetooth version 5-compliant protocol stack to accommodate, e.g., a Bluetooth Low Energy (LE) or a Bluetooth Classic protocol, and may support multiple connections, concurrent central, peripheral, broadcaster, and observer roles.

In turn, API 540 interfaces with a GATT database 550 which, as described herein, may be implemented as the hybrid GATT database. GATT database 550 may interact with additional layers of the Bluetooth stack including a generic access profile (GAP) 560, which may define generic procedures regarding Bluetooth discovery and link management, and may further define various roles including, e.g., broadcaster, observer, peripheral and central roles. A security manager (SM) 570 may perform security operations relating to pairing, authentication and encryption between devices in communication. Attribute (ATT) layer 555 may define a client/server architecture to enable communication of attributes between devices. Finally, a link layer 580 may manage physical wireless connections including Bluetooth LE connections between devices and may act as an interface between various layers above it and wireless processor 520.

In one or more embodiments, multiple modes may be supported. In a first mode, also referred to as a standalone mode, both the Bluetooth stack and an application 530 run in wireless processor 520 of wireless device 510, as in FIG. 5A.

Figure 5B:
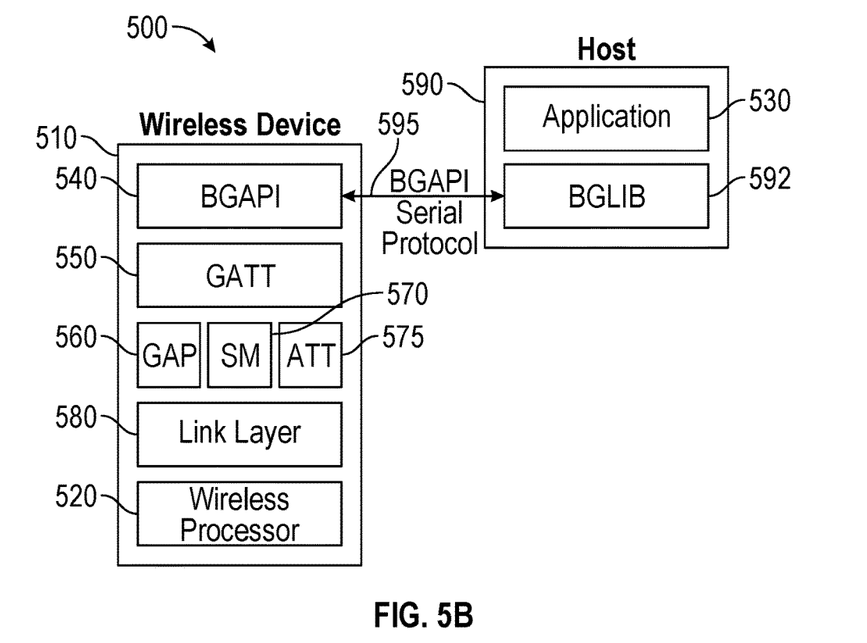

Referring now to FIG. 5B, shown is a network environment 500' in which wireless device 510 is in communication with a host device 590. As shown in this implementation, application 530 may execute on host device 590 which, in an embodiment, may be implemented with a microcontroller unit (MCU). Host device 590 may further include a Bluetooth library 592. APIs 540 may be exposed via a serial interface 595, e.g., a UART interface. In an embodiment, serial protocol 595 may be implemented as a lightweight binary protocol that carries the BGAPI commands from host device 590 to the Bluetooth stack and responses and events from the Bluetooth stack back to host device 590.

In network environment 500', wireless device 510 may operate in a second mode, also referred to as a NCP mode, where the Bluetooth stack executes on wireless processor 520 of wireless device 510 and application 530 runs on host device 590. In NCP mode it is also possible to take GATT database code on the host side and turn it into dynamic API calls to transmit the database structure over UART. While shown in these high levels in FIGS. 5A and 5B, understand that variations and alternatives are possible.

Figure 6:
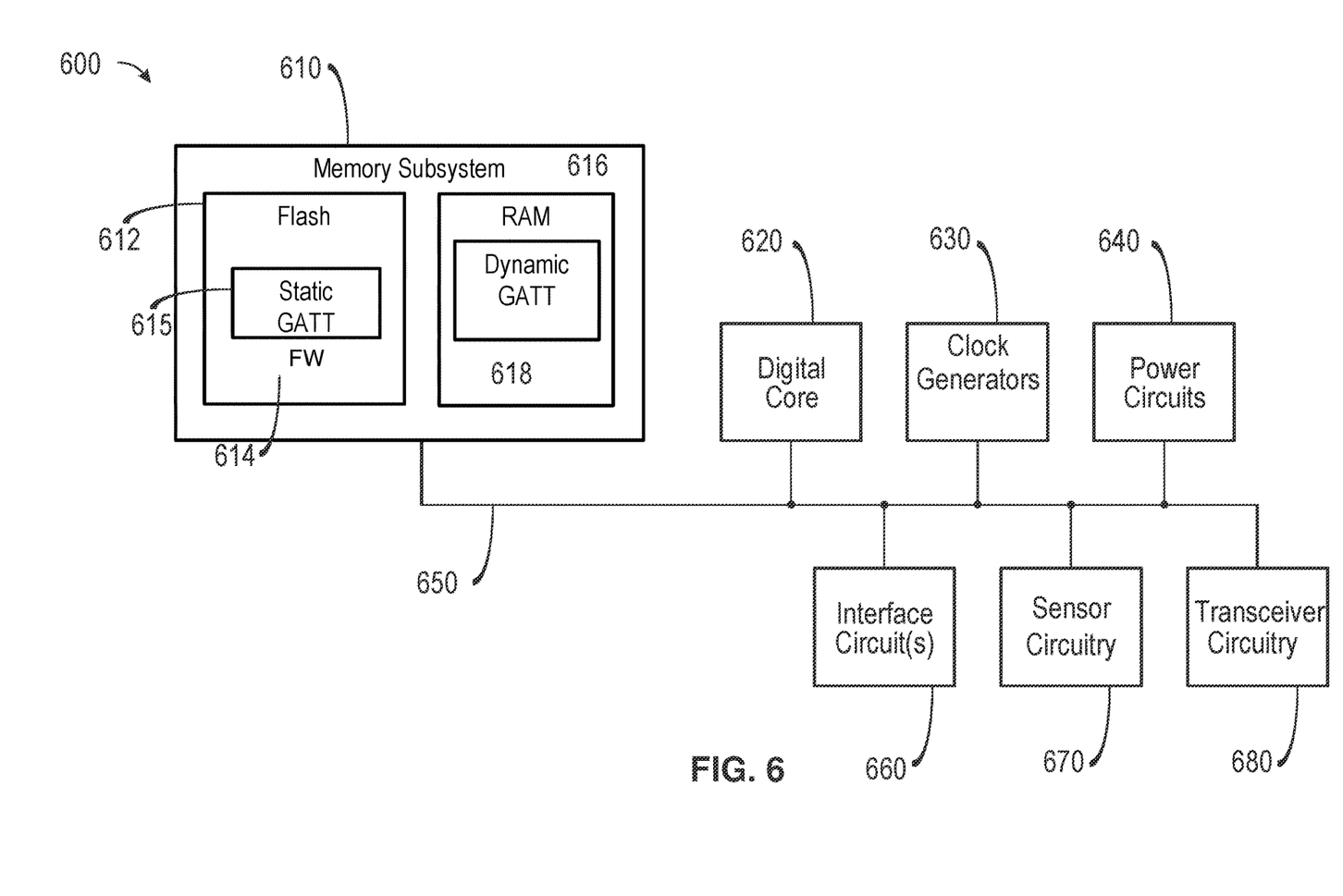
FIG. 6 is a block diagram of a representative integrated circuit in accordance with an embodiment.

Referring now to FIG. 6, shown is a block diagram of a representative integrated circuit 600 that includes a hybrid GATT database structure as described herein. In the embodiment shown in FIG. 6, integrated circuit 600 may be, e.g., a microcontroller having a wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 600 includes a memory subsystem 610 which in an embodiment may include a non-volatile memory such as a flash memory 612 and volatile storage, such as RAM 616. In an embodiment, flash memory 612 may be implemented as a non-transitory storage medium that can store instructions and data. Such non-volatile memory may store instructions, including a firmware 614 for operation of integrated circuit 600. As shown, firmware 614 may include a static GATT database 615, namely a static portion of a hybrid GATT database structure, as described herein. In one or more embodiments, flash memory 612 may further store a Bluetooth application that can dynamically update a GATT database as described herein, e.g., using APIs that also may be stored in flash memory 612. And in turn, RAM 616 may include a dynamic GATT database 618, namely a dynamic portion of a hybrid GATT database structure, as described herein.

Memory subsystem 610 couples via a bus 650 to a digital core 620, which may include one or more cores and/or microcontrollers that act as a main processing unit of the integrated circuit. Such digital core 620 may execute a Bluetooth stack to interact with the hybrid GATT database structure. In turn, digital core 620 may couple to clock generators 630 which may provide one or more phase locked loops or other clock generator circuitry to generate various clocks for use by circuitry of the IC. As further illustrated, IC 600 further includes power circuitry 640, which may include one or more voltage regulators. Additional circuitry may optionally be present depending on particular implementation to provide various functionality and interaction with external devices. Such circuitry may include interface circuitry 660 which may provide interface with various off-chip devices, sensor circuitry 670 which may include various on-chip sensors including digital and analog sensors to sense desired signals, such as for a metering application or so forth.

In addition as shown in FIG. 6, transceiver circuitry 680 may be provided to enable transmission and receipt of wireless signals, e.g., according to one or more of a local area or wide area wireless communication scheme, including Bluetooth, Zigbee, IEEE 802.11, IEEE 802.15.4, cellular communication or so forth. Understand while shown with this high level view, many variations and alternatives are possible.

Note that ICs such as described herein may be implemented in a variety of different devices such as an IoT device. This IoT device may be, as two examples, a smart bulb of a home or industrial automation network or a smart utility meter for use in a smart utility network, e.g., a mesh network in which communication is according to an IEEE 802.15.4 specification or other such wireless protocol.

Figure 7:
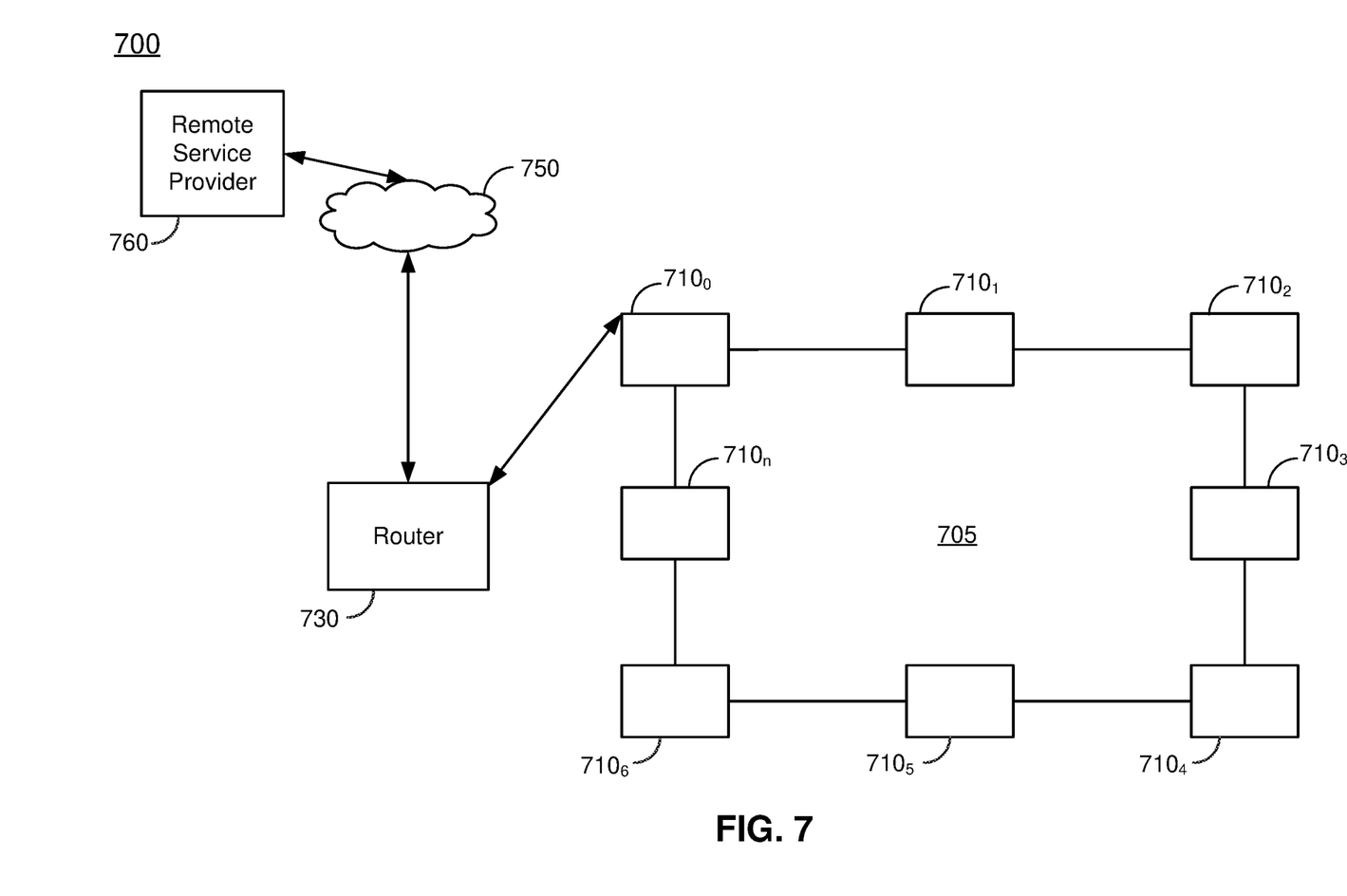
FIG. 7 is a high level diagram of a network in accordance with an embodiment.

Referring now to FIG. 7, shown is a high level diagram of a network in accordance with an embodiment. As shown in FIG. 7, a network 700 includes a variety of devices, including smart devices such as IoT devices, routers and remote service providers. In the embodiment of FIG. 7, a mesh network 705 may be present, e.g., in a building having multiple IoT devices 7100-n. Such IoT devices may be configured to dynamically update GATT database definitions to realize a hybrid GATT database structure as described herein. As shown, at least one IoT device 7100 couples to a router 730 that in turn communicates with a remote service provider 760 via a wide area network 750, e.g., the internet. In an embodiment, remote service provider 760 may be a backend server of a utility that handles communication with IoT devices 710. Understand while shown at this high level in the embodiment of FIG. 7, many variations and alternatives are possible.

With embodiments, dynamic GATT services are provided that allow target applications to define or change GATT services at runtime, by a target application itself or by a host application sending NCP commands. Embodiments may further simplify firmware update procedures. In a conventional system, in case of change in GATT services, both host and target applications need to be updated. With dynamic GATT services provided by an embodiment, a host application can command a target application and create GATT services at runtime, such that only the host application needs to be updated. Embodiments may further enable greater flexibility for application development. This is so, as conventional static GATT services are defined at compile time and client applications are allowed to discover them all. Dynamic GATT services generated in accordance with an embodiment allow target applications to present different versions of GATT services according to a client's need or access rights. Therefore, customers can develop more sophisticated applications that can solve different problems for different users. With an embodiment, backwards compatibility may be realized as both static, dynamic and hybrid implementations may be supported, while optimizing both flash and RAM.

With embodiments, dynamically created GATT attributes can coexist with a static GATT database, e.g., generated from a GATT XML file. For example, in a NCP mode a target application where the GATT database is located does not need to be modified, such that a GATT database can be built from a host device side with APIs. Or a GATT configurator can be used to build a static GATT database. In one or more embodiments, dynamic GATT database updates may occur in a session, in which changes are saved when the session is finished by committing the changes. Unsaved changes may be invisible to a connected remote GATT client, and modifications/updates only take effect when the session is finished. In an embodiment each added service and characteristic may be started with an appropriate API to become visible to connected clients.

Referring now to Table 1 below, shown is an example implementation for dynamically adding an example service and characteristic in an embodiment. More specifically, Table 1 shows an update technique for adding a Health Thermometer Service and Temperature Measurement characteristic dynamically to a GATT database.

TABLE 1

```
//create a session for database update
sl_bt_gattdb_new_session(&session);
//add Thermometer service (UUID: 0x1809) to GATT database, as an advertised
primary service   sl_bt_gattdb_add_service(session, sl_bt_gattdb_primary_service,
        T_GATTDB_ADVERTISED_SERVICE,2,uuid_service, &service);
//add Temperature measurement (UUID:0x2A1C) characteristic to the service
   sl_bt_gattdb_add_uuid16_characteristic(session, service,
SL_BT_GATTDB_CHARACTERISTIC_INDICATE,
            0, 0, uuid_characteristic, sl_bt_gattdb_fixed_length_value,
            1, 1, 0, &characteristic);
//activate new service
sl_bt_gattdb_start_service(session, service);
//activate new characteristic
sl_bt_gattdb_start_characteristic(session, characteristic);
//save changes and close GATT database editing session
sl_bt_gattdb_commit(session);
```

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
a hybrid generic attribute (GATT) database structure of a wireless protocol stack, the hybrid GATT database structure comprising a static portion to be generated at design time and a dynamic portion to be dynamically generated during runtime of the apparatus, the hybrid GATT database structure to interface with a wireless protocol application programming interface of the wireless protocol stack and a generic access profile of the wireless protocol stack, the hybrid GATT database structure comprising:
a volatile memory to store the dynamic portion, the dynamic portion comprising first attribute data stored in a first attribute data array of the volatile memory, wherein the first attribute data is dynamic attribute data that is dynamically added to the hybrid GATT database structure during the runtime; and
a non-volatile memory coupled to the volatile memory to store the static portion, the static portion comprising second attribute data stored in a second attribute data array of the non-volatile memory, wherein the second attribute data is static attribute data generated at the design time, wherein the volatile memory is to store an attribute index array to identify whether an attribute datum of the hybrid GATT database structure is stored in the volatile memory or the non-volatile memory, wherein the first attribute data and the second attribute data comprise GATT service and characteristic information.

2. The apparatus of claim 1, wherein the attribute index array comprises a plurality of entries, each of the plurality of entries to point to a location of an attribute datum within the volatile memory or the non-volatile memory.

3. The apparatus of claim 2, wherein the non-volatile memory further comprises a second attribute index array, wherein the apparatus is to write the second attribute index array into the attribute index array when an update to the hybrid GATT database structure is to occur during the runtime.

4. The apparatus of claim 2, wherein the plurality of entries have a uniform size, each of the plurality of entries comprising type information and address information to identify an attribute datum of the hybrid GATT database structure.

5. The apparatus of claim 2, wherein apparatus is to dynamically add one or more entries to the attribute index array, the one or more entries to point to one or more attribute data dynamically stored in the dynamic portion of the hybrid GATT database structure.

6. The apparatus of claim 1, wherein the apparatus comprises a wireless device, the wireless device to execute an application, the application to dynamically update the dynamic portion of the hybrid GATT database structure during the runtime via one or more application programming interfaces, the hybrid GATT database structure to appear to the application as a single entity.

7. The apparatus of claim 1, wherein the apparatus comprises a wireless device, and in a network coprocessor mode, the wireless device is to receive one or more application programming interface commands from a host device coupled to the wireless device and, in response to the one or more application programming interface commands, dynamically update the dynamic portion of the hybrid GATT database structure.

8. The apparatus of claim 1, wherein the static portion of the hybrid GATT database structure is to be defined via a software development kit, the software development kit to convert the second attribute data of the static portion of the hybrid GATT database structure into code to enable the code to be stored into the non-volatile memory.

9. The apparatus of claim 1, wherein the dynamic portion of the hybrid GATT database structure comprises a plurality of the first attribute data, wherein each of the plurality of the first attribute data is adjacent at least one other of the plurality of the first attribute data.

10. The apparatus of claim 1, wherein the non-volatile memory comprises a flash memory, the flash memory comprising a firmware for a wireless device, the firmware comprising the static portion of the hybrid GATT database structure.

11. A method comprising:
receiving in a wireless device a field request during runtime, via an application programming interface, the field request comprising an updated database definition of a hybrid generic attribute (GATT) database of a wireless protocol stack, the hybrid GATT database to interface with a wireless protocol application programming interface of the wireless protocol stack and a generic access profile of the wireless protocol stack, the hybrid GATT database comprising:
a static portion stored in a non-volatile memory, the static portion comprising first attribute data stored in a first attribute data array of the non-volatile memory, the first attribute data comprising static GATT service and characteristic information; and
a dynamic portion stored in a volatile memory, the dynamic portion comprising second attribute data stored in a second attribute data array of the volatile memory, the second attribute data comprising dynamic GATT service and characteristic information;
in response to the updated database definition, storing the second attribute data comprising updated attribute data in the second attribute data array of the volatile memory; and
storing an entry to the updated attribute data in an attribute index array of the volatile memory.

12. The method of claim 11, further comprising receiving the updated attribute data from an application in execution on the wireless device, the wireless device further comprising the non-volatile memory and the volatile memory.

13. The method of claim 11, further comprising informing a host device regarding completion of an update to the hybrid GATT database after storing the entry to the attribute index array.

14. The method of claim 11, further comprising storing the updated attribute data in response to the field request for a GATT database update received in the wireless device from a host device.

15. The method of claim 14, further comprising receiving the field request in a network coprocessor mode via a serial protocol from an application in execution on the host device, the hybrid GATT database to appear to the application as a single entity.

16. The method of claim 11, further comprising writing a second attribute index array associated with the static portion and obtained from the non-volatile memory into the attribute index array.

17. The method of claim 16, further comprising:
accessing at least one attribute datum from the dynamic portion stored in the volatile memory using a first entry stored in the attribute index array;
accessing at least one second attribute datum from the static portion stored in the non- volatile memory using a second entry included in the second attribute index array; and
sending the at least one attribute datum and the at least one second attribute datum to a requester.

18. A system comprising:
a wireless processor comprising a radio frequency transceiver circuit, conversion circuitry, and digital circuitry comprising a volatile memory and a non-volatile memory, wherein:
the volatile memory comprises a random access memory to store a dynamic portion of a hybrid generic attribute (GATT) database structure of a wireless protocol stack, the hybrid GATT database structure comprising a static portion and the dynamic portion, the hybrid GATT database structure to appear to an application as a single entity and to interface with a wireless protocol application programming interface of the wireless protocol stack and a generic access profile of the wireless protocol stack;

the non-volatile memory comprising a flash memory coupled to the volatile memory, the non-volatile memory to store the static portion of the hybrid GATT database structure; and the wireless processor is to dynamically update one or more attribute datum comprising GATT service and characteristic information stored in the volatile memory and provide one or more entries in an attribute index array of the volatile memory to point to the one or more updated attribute datum.

19. The system of claim 18, wherein the attribute index array comprises a plurality of entries, each of the plurality of entries to point to a location of an attribute datum within the volatile memory or the non-volatile memory, and the non-volatile memory further comprises a second attribute index array, wherein the wireless processor is to write the second attribute index array into the volatile memory.

20. The system of claim 18, wherein in a network coprocessor mode, the wireless processor is to receive an update request via one or more application programming interfaces from an application in execution on a host device and in response to the update request, to dynamically update the one or more attribute datum stored in the volatile memory, the dynamic update comprises adding at least one attribute datum to the volatile memory.

* * * * *